(12) United States Patent
Oki et al.

(10) Patent No.: US 6,483,727 B2
(45) Date of Patent: Nov. 19, 2002

(54) STABILIZED DC POWER SUPPLY DEVICE

(75) Inventors: Hirokazu Oki, Kyoto (JP); Koichi Inoue, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 09/987,115

(22) Filed: Nov. 13, 2001

(65) Prior Publication Data
US 2002/0060558 A1 May 23, 2002

(30) Foreign Application Priority Data
Nov. 17, 2000 (JP) ........................................ 2000-350596

(51) Int. Cl.$^7$ ................................ H02J 1/02; G05F 1/40
(52) U.S. Cl. ......................................... 363/39; 323/280
(58) Field of Search ......................... 363/39, 45, 46; 323/280, 282, 285

(56) References Cited

U.S. PATENT DOCUMENTS 5,589,759 A * 12/1996 Borgato et al. ............. 323/222
5,850,139 A * 12/1998 Edwards ..................... 323/280
6,188,211 B1 * 2/2001 Rincon-Mora et al. ..... 323/280
6,246,221 B1 * 6/2001 Xi ............................... 323/280

* cited by examiner

Primary Examiner—Matthew Nguyen
(74) Attorney, Agent, or Firm—Rader, Fishman & Grauer PLLC

(57) ABSTRACT

A stabilized DC power supply device that maintains an output voltage thereof at a constant level despite a fluctuation arising in a power supply voltage fed thereto comprises a control circuit that compares the output voltage with a reference voltage so as to output a control signal by which the output voltage is maintained at a predetermined level, and a ripple cancellation circuit that amplifies an undulating component included in the power supply voltage at a predetermined gain and that feeds out a resulting signal as an undulation compensation signal for correcting the output voltage, wherein the undulation compensation signal for correcting the output voltage is superimposed on the reference voltage so as to prevent an undulation arising in the power supply voltage from appearing in the output voltage.

9 Claims, 4 Drawing Sheets

US 6,483,727 B2

STABILIZED DC POWER SUPPLY DEVICE

BACKGROUND OF THE INVENTION

1. Field of the Invention

The present invention relates to a stabilized DC (direct current) power supply device that supplies a stabilized DC voltage to a load.

2. Description of the Prior Art

A conventional stabilized DC power supply device as shown in FIG. 4 is described hereinafter as an example. As shown in FIG. 4, a base, an emitter, and a collector of an NPN transistor 1 are connected to an output terminal of an operational amplifier 2, an output terminal O, and a power supply voltage $V_{CC}$ respectively. At the same time, the emitter of the transistor 1 is connected to ground via resistors 3 and 4, each of which has a large resistance and is connected in series so as to detect an output voltage $V_{OUT}$ (a voltage supplied to a load 100) at the output terminal O. A DC voltage Vref is applied to a noninverting input terminal (positive input terminal) of the operational amplifier 2. A node between the resistors 3 and 4 is connected to an inverting input terminal (negative input terminal) of the operational amplifier 2.

In the circuit configuration as described above, a current $I_{OUT}$ is supplied from the power supply voltage $V_{CC}$ via the transistor 1 to the load 100 that is connected to the output terminal O. It can be assumed that the current $I_{OUT}$ passing through the load 100 is nearly equal to an emitter current $I_E$ passing through the transistor 1 because the resistors 3 and 4 have a large resistance. Therefore, if it is assumed that the load 100 has an impedance of Z, then the output voltage $V_{OUT}$ is given by $$V_{OUT} \approx I_E \times Z$$

The emitter current $I_E$ of the transistor 1 is controlled by a control circuit 10 comprising the transistor 1, operational amplifier 2, resistors 3 and 4, and connections arranged therein so that a voltage measured at the node between the resistors 3 and 4 becomes equal to the DC voltage Vref. As a result, the output voltage $V_{OUT}$ is stabilized at a constant voltage even if the power supply voltage $V_{CC}$ fluctuates in DC voltage or at an extremely low frequency.

Here, it is possible that the power supply voltage $V_{CC}$ fluctuates at a frequency ranging from approximately 10 Hz to 10 KHz due to noise or the like. However, the aforementioned conventional stabilized DC power supply device has a problem in which the output voltage $V_{OUT}$ fluctuates in phase with the power supply voltage $V_{CC}$ when the power supply voltage undulates at the aforementioned frequency. This is caused by the control circuit 10 not capable of controlling the emitter current $I_E$ of the transistor 1 in response to the frequency, thereby vibrating the emitter current $I_E$ accordingly. Consequently, if a ripple voltage arises in the power supply voltage $V_{CC}$, a resulting ripple voltage also arises in the output voltage that can not be cancelled satisfactorily.

SUMMARY OF THE INVENTION

An object of the present invention is to provide a stabilized DC power supply device having a high capability of removing a ripple voltage from an output voltage even if the ripple voltage arises in a power supply voltage.

To achieve the above object, according to one aspect of the present invention, a stabilized DC power supply device that maintains an output voltage thereof at a constant level despite a fluctuation arising in a power supply voltage fed thereto comprises a control circuit that compares the output voltage with a reference voltage so as to output a control signal by which the output voltage is maintained at a predetermined level, and a ripple cancellation circuit that amplifies an undulating component included in the power supply voltage at a predetermined gain and that feeds out a resulting signal as an undulation compensation signal for correcting the output voltage, wherein the undulation compensation signal for correcting the output voltage is superimposed on the reference voltage so as to prevent an undulation arising in the power supply voltage from appearing in the output voltage.

In this structure, the reference voltage of the control circuit that controls the output voltage is automatically compensated so that the output voltage can be maintained at a constant level if the power supply voltage fluctuates or even if the power supply voltage undulates at a higher frequency.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Figure 1:
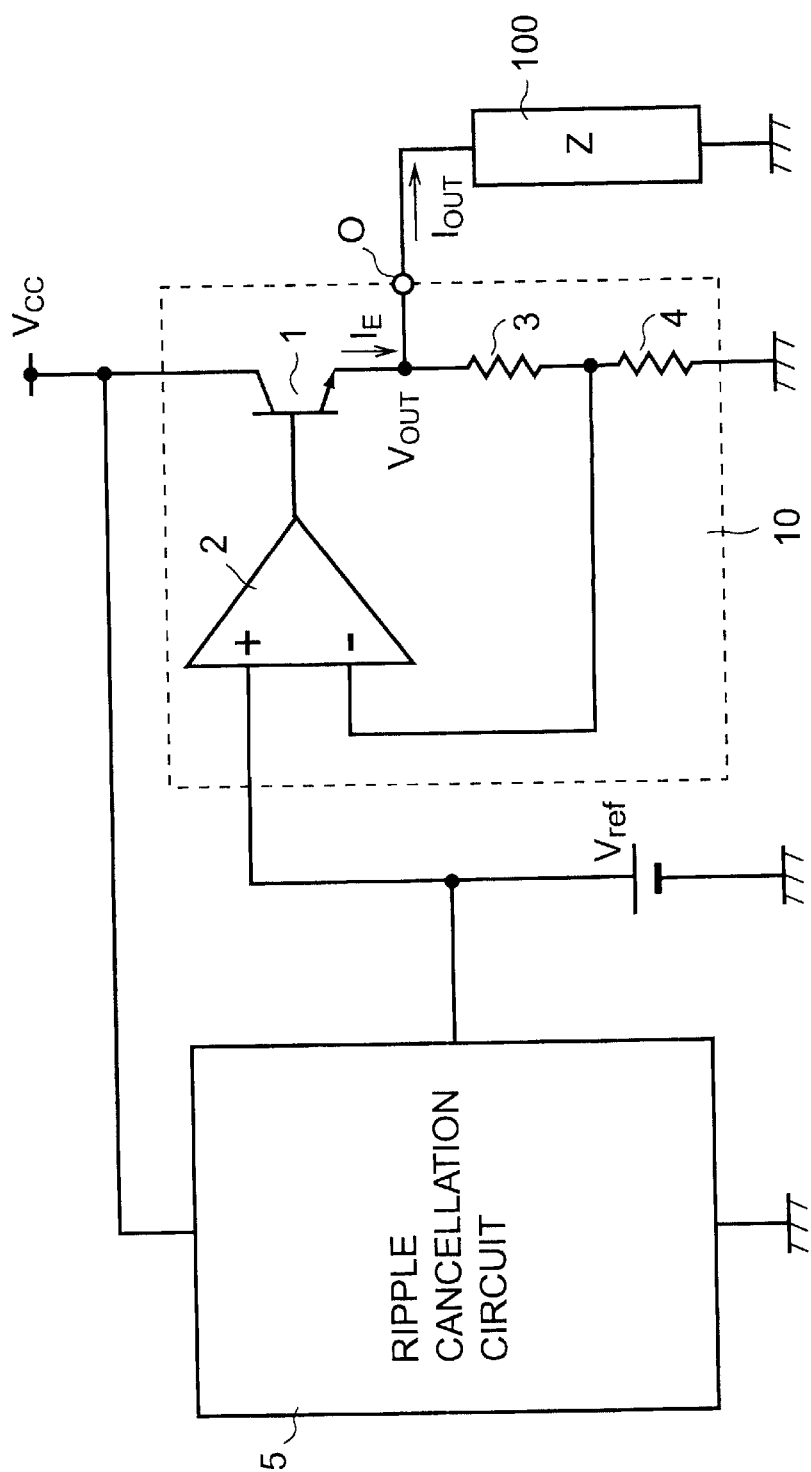
FIG. 1 is a circuit diagram showing a stabilized DC power supply device of a first embodiment of the invention.
Figure 4:
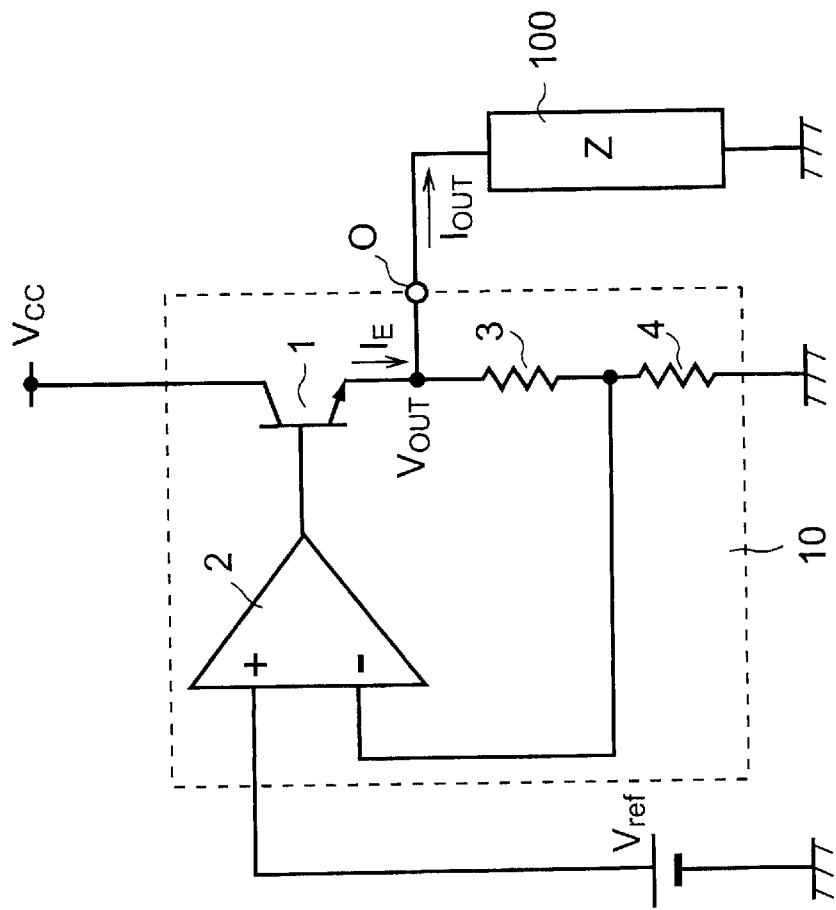
FIG. 4 is a circuit diagram showing a conventional stabilized DC power supply device.

Hereinafter, embodiments of the present invention will be described with reference to the accompanying drawings. FIG. 1 is a circuit diagram showing a stabilized DC power supply device of a first embodiment of the invention. Such identical components as are found also in FIG. 4 showing a conventional stabilized DC power supply device are identified with the same reference numerals, and overlapping descriptions will not be repeated.

In the stabilized DC power supply device of the first embodiment, an output voltage $V_{OUT}$ of a control circuit 10 is maintained at a predetermined level when a fluctuation or an undulation that a conventional stabilized DC power supply device is not capable of correcting. To achieve this, resistors 3 and 4 are connected in series between the output voltage $V_{OUT}$ and ground. A voltage obtained by dividing the output voltage $V_{OUT}$ at a node between the resistors 3 and 4 is fed to an inverting input terminal (negative terminal) of an operational amplifier 2. A reference voltage Vref is fed to a noninverting input terminal (positive terminal) of the operational amplifier 2.

Because of this arrangement, if the voltage fed to the inverting input terminal, i.e. the voltage obtained through dividing the output voltage $V_{OUT}$, becomes lower than the reference voltage Vref that is fed to the noninverting input terminal, the operational amplifier 2 feeds out a control voltage to a base of a transistor 1 from an output terminal thereof. The control voltage thus fed to the base induces an increased flow of an emitter current $I_E$ through the transistor 1 and raises the output voltage $V_{OUT}$. On the other hand, when the voltage obtained through dividing the output voltage $V_{OUT}$ becomes higher than the reference voltage Vref, the control circuit functions in the opposite way.

However, as described before, if the power supply voltage $V_{CC}$ undulates at a frequency ranging from approximately 10 Hz to 10 KHz, then the control circuit can not respond to the frequency and, as a result, undulations arise as a ripple voltage in the output voltage. Therefore it is necessary to effectively control the control circuit 10 so that the ripple voltage appearing in the power supply voltage $V_{CC}$ does not appear in the output voltage $V_{OUT}$. This is achieved by changing the reference voltage that is fed to the noninverting input terminal of the control circuit 10 in the direction opposite to the ripple voltage.

Figure 2:
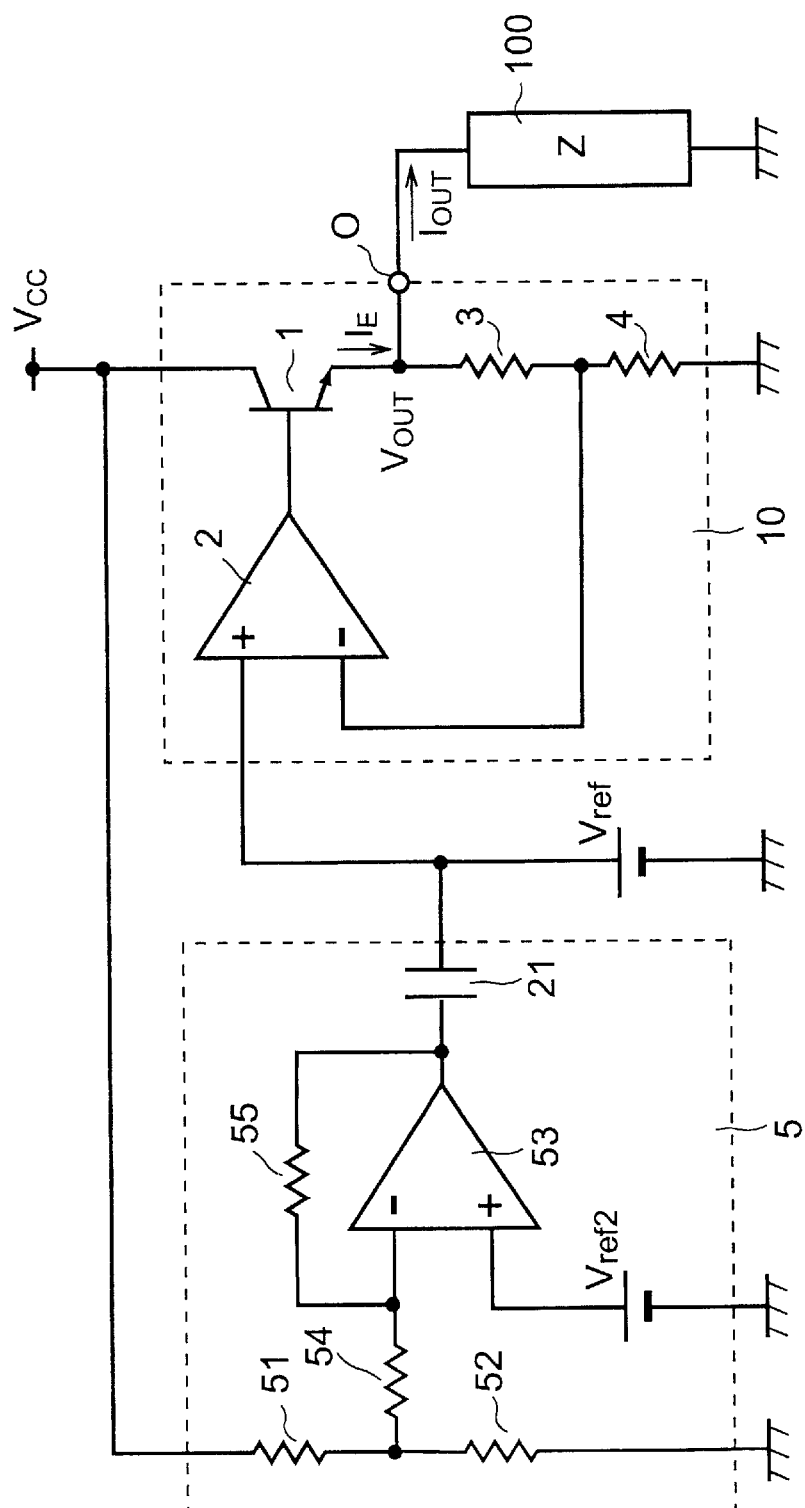
FIG. 2 is a circuit diagram showing a configuration of a ripple cancellation circuit shown in FIG. 1.

FIG. 2 is a circuit diagram showing a configuration example of a ripple cancellation circuit 5 shown in FIG. 1. Resistors 51 and 52 are connected in series between the power supply voltage $V_{CC}$ and ground. A noninverting input terminal (positive terminal) of an operational amplifier 53 is connected to a DC voltage Vref2 and an inverting input terminal (negative terminal) thereof is connected to a node between the resistors 51 and 52 via a resistor 54. An output side of the operational amplifier 53 is connected to the inverting input terminal thereof via a resistor 55 and is also connected to one end of a capacitor 21 that does not permit the DC current to pass therethrough. Another end of the capacitor 21 is connected to the noninverting input terminal of the operational amplifier 2 of the control circuit 10.

In this configuration, if appropriate resistances are given to the resistors 51, 52, 54, and 55 respectively, it is possible to feed to the noninverting input terminal of the operational amplifier 2 as an undulation compensation signal, a voltage obtained through superimposing the reference voltage Vref on an AC (alternating current) component extracted from the power supply voltage after inverting and amplifying the power supply voltage.

Therefore, the reference voltage fed to the noninverting input terminal of the operational amplifier 2 changes according to the ripple voltage arising in the power supply voltage $V_{CC}$ so as to cancel the ripple voltage. As a result, the output voltage $V_{OUT}$ does not undulates even if the power supply voltage $V_{CC}$ undulates at a reasonably high frequency, thereby contributing to removing the ripple voltage appearing otherwise in the output voltage $V_{OUT}$.

Figure 3:
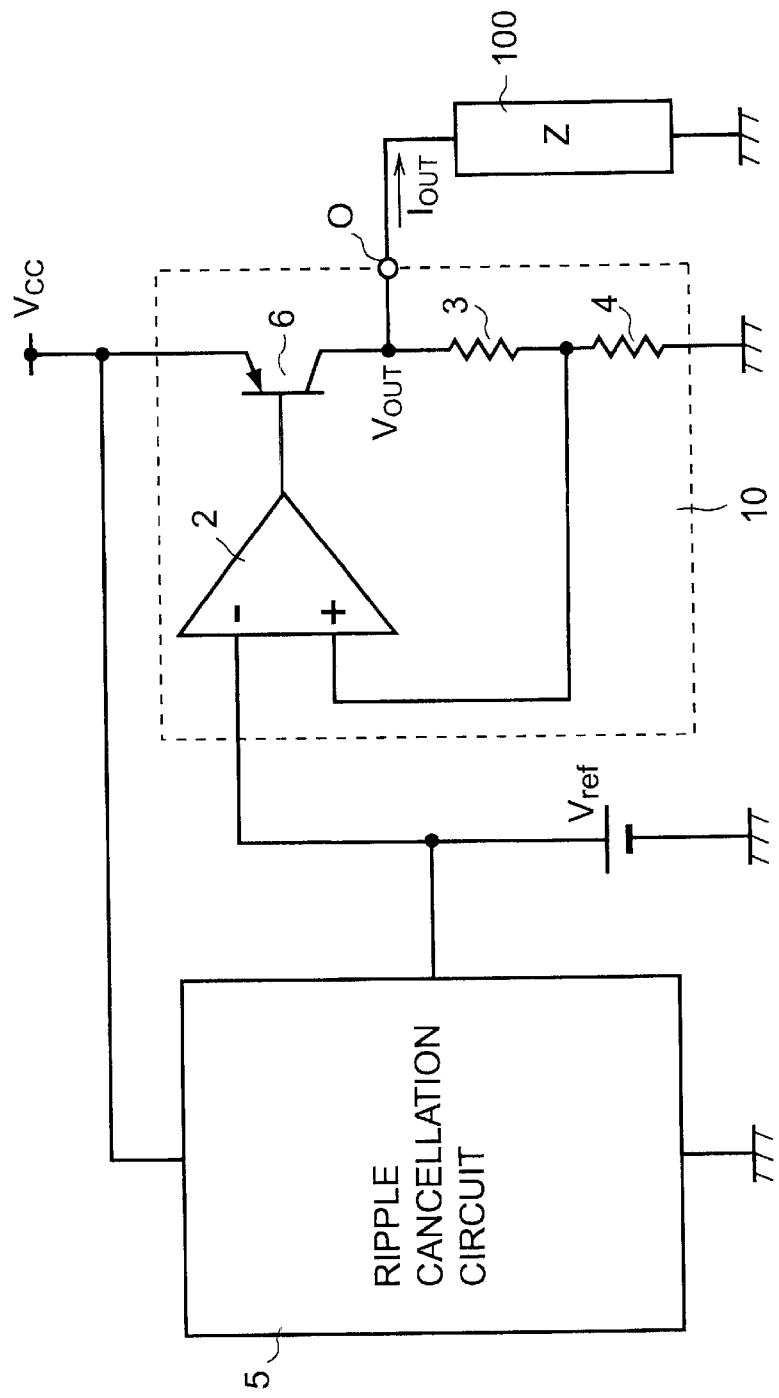
FIG. 3 is a circuit diagram showing a stabilized DC power supply device of a second embodiment of the invention.

FIG. 3 is a circuit diagram showing a stabilized DC power supply device of a second embodiment of the invention. The control circuit 10 has a different configuration from the one shown in the first embodiment. More specifically, the noninverting input terminal of the operational amplifier 2 is connected to the node between the resistors 3 and 4. The inverting input terminal is connected to a node between the reference voltage Vref and an output side of the ripple cancellation circuit 5.

As described before, the inverting input terminal receives a resulting signal obtained through superimposing the reference voltage Vref on an AC component signal that serves to compensate the ripple voltage. At the same time, in lieu of the NPN transistor 1, it is also possible to use a PNP transistor 6 having a base thereof connected to an output side of the operational amplifier 2, an emitter thereof connected to the power supply voltage $V_{CC}$, and a collector thereof connected to a node between an output terminal O and the resistor 3.

As described above, according to the stabilized DC power supply device of this invention, the output voltage thereof can be maintained at a predetermined level if ordinary fluctuations or even if undulations at a higher frequency arise in the power supply voltage because the undulation compensation signal is superimposed on the reference voltage.

What is claimed is:

1. A stabilized DC power supply device that maintains an output voltage thereof at a constant level despite a fluctuation arising in a power supply voltage fed thereto, comprising:

a control circuit that compares the output voltage with a reference voltage so as to output a control signal by which the output voltage is maintained at a predetermined level; and a ripple cancellation circuit that amplifies an undulating component included in the power supply voltage at a predetermined gain and that feeds out a resulting signal as an undulation compensation signal for correcting the output voltage, wherein the undulation compensation signal for correcting the output voltage is superimposed on the reference voltage so as to prevent an undulation arising in the power supply voltage from appearing in the output voltage.

2. A stabilized DC power supply device as claimed in claim 1, wherein the ripple cancellation circuit comprises an inverting amplifier and the control circuit comprises a noninverting amplifier.

3. A stabilized DC power supply device as claimed in claim 1, wherein the ripple cancellation circuit comprises an inverting amplifier and the control circuit comprises an inverting amplifier.

4. A stabilized DC power supply device that maintains an output voltage thereof at a constant level despite a fluctuation arising in a power supply voltage fed thereto, comprising:

an operational amplifier having a first input terminal to which a reference voltage is supplied, a second input terminal to which a divided portion of the output voltage is supplied, and an output terminal from which a control signal for compensating for a difference detected between the reference voltage and the divided portion of the output voltage is fed out;

a transistor that regulates the output voltage at a predetermined level by controlling a current passing therethrough according to a control signal fed from the output terminal of the operational amplifier; and a ripple cancellation circuit that amplifies an undulation component included in the power supply voltage at a predetermined gain and feeds out a resulting signal as an undulation compensation signal for correcting the output voltage, wherein the undulation compensation signal for correcting the output voltage is superimposed on the reference voltage so as to prevent an undulation arising in the power supply voltage from appearing in the output voltage.

5. A stabilized DC power supply device as claimed in claim 4, wherein the ripple cancellation circuit comprises an inverting amplifier, the operational amplifier comprises a noninverting amplifier, and the transistor is an NPN transistor.

6. A stabilized DC power supply device as claimed in claim 4,
   wherein the ripple cancellation circuit comprises an inverting amplifier, the operational amplifier comprises an inverting amplifier, and the transistor is a PNP transistor.

7. A stabilized DC power supply device that maintains an output voltage thereof at a constant level despite a fluctuation arising in a power supply voltage fed thereto, comprising:
   a first operational amplifier having a first input terminal to which a first reference voltage is supplied, a second input terminal to which a first divided portion of the output voltage is fed back, and an output terminal from which a control signal for compensating for a difference detected between the first reference voltage and the first divided portion of the output voltage is fed out;
   a transistor that regulates the output voltage at a predetermined level by controlling a current passing therethrough according to a control signal fed from the output terminal of the first operational amplifier; and
   a first serial resistor network connected to the transistor at one end and to ground at another end for producing the first divided portion of the output voltage,
   wherein, to further stabilize the output voltage even if an undulation arises in the power supply voltage, the stabilized DC power supply device further comprises:
      a second serial resistor network for dividing the power supply voltage including the undulation;
      a second operational amplifier having a first signal input terminal to which a second divided portion of the output voltage is fed, a second signal input terminal to which a second reference voltage is fed, and a signal output terminal from which a signal is fed back to the first signal input terminal, the second operational amplifier inverting and amplifying the second divided portion of the power supply voltage; and
      a capacitor that permits only an AC component of the signal output from the signal output terminal of the second operational amplifier to pass through as an undulation compensation signal for correcting the output voltage,
      so that the undulation compensation signal for correcting the output voltage is superimposed on the first reference voltage so as to prevent the undulation, as well as the fluctuation, from appearing in the output voltage.

8. A stabilized DC power supply device as claimed in claim 7,
   wherein the first operational amplifier comprises a non-inverting amplifier and the transistor is an NPN transistor.

9. A stabilized DC power supply device as claimed in claim 7,
   wherein the first operational amplifier comprises an inverting amplifier and the transistor is a PNP transistor.

* * * * *